3,213,109
AMINOALKANOL ESTERS OF SULFOLANYL-ALKANOIC ACIDS

Herman E. Faith, Indianapolis, Ind., assignor to The Dow Chemical Company, Midland, Mich., a corporation of Delaware
No Drawing. Filed Sept. 10, 1962, Ser. No. 222,673
5 Claims. (Cl. 260—332.1)

The invention relates to novel organic compounds and more particularly relates to basic esters of fatty acids having the sulfolanyl group substituted into the alkyl group attached to the carboxylate carbon, or, having the sulfolanyl group attached to the carboxylate carbon. The invention also relates to the physiologically acceptable acid addition and methohalide salts of these esters.

The sulfolanyl group specifically employed is 3-sulfolanyl, illustrated as follows:

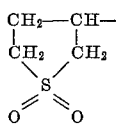

The present compounds in free base form are represented by the following structural formula:

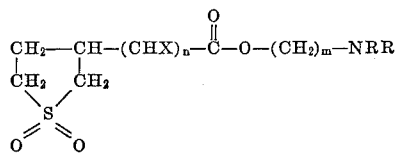

wherein
$n=0$ or 1,
$X=H$ or phenyl,
$m=1, 2$ or 3,
$R=$methyl or ethyl.

The present compounds in free base form are crystalline solids which are moderately soluble in most of the more polar organic solvents, and from low to moderate solubility in water. By low to moderate solubility in water is meant having a solubility of from about 1 gram to about 12 grams per 100 grams of water.

These basic esters exhibiting the 3-sulfolanyl group as well as tertiary amino and ester groups are adapted to be employed as active toxicants in compositions for the control of internal parasites in warm blooded animals, especially the helminths which invade the intestinal tract. The compounds have general biological activity and are useful as insecticides and herbicides.

The compounds of the invention may be prepared in various ways as desired. The appropriate 3-sulfolanyl-alkanoic acid is reacted (1) with an alkylaminoalkanol in anhydrous solvent medium, or (2) with a dialkylaminoalkyl halide.

The 3-sulfolanylalkanoic acid may be prepared (1) by reacting a 3-halosulfolane with diethyl malonate or ethyl acetoacetate in the presence of sodium ethoxide in an alkylation type reaction, after which the malonic ester is decarboxylated and saponified to obtain the monocarboxylic acid, or (2) by the addition of diethyl α-phenylmalonate to either of α-sulfolene or β-sulfolene in the presence of sodium and anhydrous organic solvent, followed by decarboxylation and saponification of the ester to obtain the monocarboxylic acid.

Reaction is generally brought about by heating the reactants in anhydrous organic solvent medium, e.g., isopropyl alcohol. Heating may be conveniently carried out at reflux temperature for from 2 to 8 hours. Generally, equimolar amounts of the reactants may be used, or a slight excess of the amine may be used, if desired.

Upon completion of the reaction, the reaction product is recovered from the reaction mixture, as by heating to remove solvent medium and unreacted amine, or, by precipitation of the salt of the basic ester with anhydrous ether, and filtration to recover the precipitate. In either event, the recovered crude salt is treated with an alkaline aqueous solution, e.g., sodium bicarbonate solution, to obtain the base which is extracted from the water phase with ether, and precipitated from the ethereal solution as an acid addition salt. The methohalide salt is prepared by the reaction of free base, e.g., as recovered from ether solution, with the appropriate methyl halide at temperatures such as 40–50° C.

The following examples serve to illustrate the invention and are not to be construed as limiting.

EXAMPLE 1

*2-diethylaminoethyl-3-sulfolanylcarboxylate hydrochloride*

3-sulfolanylcarboxylic acid was reacted with $PCl_3$ by heating the two together for a period of about an hour. The acid chloride was recovered upon distilling off excess $PCl_3$, then distilling off the acid chloride, under reduced pressure, from unreacted 3-sulfolanylcarboxylic acid.

To an anhydrous solution of 10.2 grams (0.087 mole) of 2-diethylaminoethanol in 30 milliliters of benzene was added 20 milliliters of pyridine. Then 17.1 grams (0.094 mole) of 3-sulfolanylcarboxylic acid chloride was added in 2-gram portions and stirred at 70° for 1.75 hours. A crude product precipitated by the addition of anhydrous ether recrystallized when treated with absolute ethanol-ether. The precipitate was taken up in water made basic with sodium bicarbonate and extracted from the alkaline solution with ether. The hydrochloride was precipitated from the ethereal solution by the addition of hydrogen chloride. The hydrochloride was purified by recrystallization from methyl ethyl ketone. The recrystallized hydrochloride exhibited a melting range of 120–122° C. and was obtained in a yield of 44 percent.

The acid oxalate addition salt of 2-diethylamino-3-sulfolanylcarboxylate was prepared by the addition of oxalic acid to a portion of the ether extract which had been set aside. The acid oxalate salt was recrystallized from methyl ethyl ketone. The recrystallized salt exhibited a melting point of 71.5 to 72° C.

EXAMPLE 2

*2-diethylaminoethyl-α-phenyl-3-sulfolanylacetate acid oxalate*

Sodium (0.92 gram) was reacted with 45 milliliters of dry 2-propanol at room temperature until the reaction appeared to stop. N,N-diethyl-2-chloroethylamine hydrochloride (7 grams, 0.0496 mole) and α-phenyl-3-sulfolanylacetic acid were added to the sodium isopropoxide solution and refluxed for 8 hours. The hot reaction mixture was filtered and the clear filtrate was concentrated to a sirup. The sirup was thoroughly admixed with 10 percent sodium hydroxide solution and the free base was then taken up in ether. The ether solution was washed with water and the acid oxalate was precipitated from the ether solution by the addition of oxalic acid. The acid oxalate exhibited a melting range of 139–140° C. and was obtained in a yield of 73 percent.

Some of the washed ether extract was evaporated to dryness in order to recover the base in crystalline form which exhibited a melting range of 67–68° C. Another portion of ether extract which had been set aside was reacted with methyl diodide to obtain the methiodide salt of 2 - diethylaminoethyl - α - phenyl-3-sulfolanyl-acetate which melted at about 50° C.

In a manner similar to that set forth in the foregoing examples, the N,N-dimethylaminomethyl, N,N-dimethylaminoethyl, N,N-dimethylaminopropyl, N,N-diethylaminomethyl and N,N-diethylaminopropyl esters may be prepared using the requisite dialkylaminoalkanol or dialkylaminoalkylhalide and a sulfolanylalkanoic acid.

The compounds of the invention are generally employed in the form of a methohalide salt or as a physiologically acceptable acid addition salt, because of the greater water solubility than the free base. The suitable methohalide salts are the methochlorides, methobromides and methoiodides. The suitable acid addition salts include the hydrochlorides, hydrobromides, hydroiodides, maleates, oxalates, succinates and tartrates.

In administering a compound of the invention as an active toxicant for the control of helminths, the compound may be administered in a number of ways, e.g., in daily dosage amounts in gelatin capsules, or the compound may be incorporated in the drinking water or the feed diet of the animal. Feed compositions are generally prepared to contain from about 0.01 to 1 percent by weight of one of the present compounds.

In representative operations, mice naturally infested with pinworms and/or tapeworms were fed a diet containing test compound at a level of 0.06 percent by weight for one day. Then the mice were inoculated with Ascaris ova and the test diet was continued 6 more days. At the end of the test period, the results were determined by necropsy. The use of 2-diethylaminoethyl 3-sulfolanylcarboxylate hydrochloride as the test compound gave 95 percent control of Ascaris ova.

In further operations, mice naturally infested with tapeworms were fed a diet containing 0.06 percent by weight of 2 - diethylaminoethyl-3-sulfolanylcarboxylate oxalate. At the end of a one-week test period, necropsy showed complete clearance of tapeworms.

I claim:

1. A sulfolanylalkanoic acid ester selected from the group consisting of compounds having the structural formula

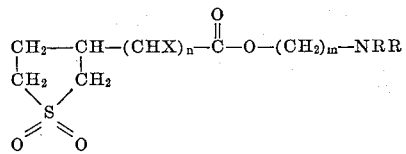

wherein $n$ is selected from the numbers consisting of 0 and 1, X is selected from the group consisting of H and phenyl, $m$ is selected from the numebrs consisting of 1, 2, 3, and R is an alkyl group selected from the group consisting of methyl and ethyl; and the physiologically acceptable acid addition salts and methohalide salts thereof.

2. The ester of 3-sulfolanylcarboxylic acid and N,N-dialkylaminoalkanol, and alkanol having from 1 to 3 carbon atoms and each of the alkyls in the dialkylamino group attached to said alkanol having from 1 to 2 carbon atoms.

3. The ester of 3-sulfolanylacetic acid and N,N-dialkylaminoalkanol, said alkanol having from 1 to 3 carbon atoms and each of the alkyls of the dialkylamino group attached to said alkanol having from 1 to 2 carbon atoms.

4. 2-diethylaminoethyl-3-sulfolanylcarboxylate.

5. 2-diethylaminoethyl-α-phenyl-3-sulfolanylacetate.

No reference cited.

WALTER A. MODANCE, *Primary Examiner.*

UNITED STATES PATENT OFFICE
CERTIFICATE OF CORRECTION

Patent No. 3,213,109                                              October 19, 1965

Herman E. Faith

It is hereby certified that error appears in the above numbered patent requiring correction and that the said Letters Patent should read as corrected below.

Column 2, line 72, for "diodide" read -- iodide --; column 4, line 17, for "numebrs" read -- numbers --; line 23, for "and" read -- said --.

Signed and sealed this 2nd day of August 1966.

(SEAL)
Attest:

ERNEST W. SWIDER                                    EDWARD J. BRENNER
Attesting Officer                                         Commissioner of Patents